United States Patent Office 3,142,660
Patented July 28, 1964

3,142,660
MODIFICATION AND CROSS-LINKING OF FLUOROCARBON POLYMERS
Robert P. Conger, Park Ridge, N.J., assignor to United States Rubber Company, New York, N.Y., a corporation of New Jersey
No Drawing. Filed Nov. 30, 1961, Ser. No. 156,158
12 Claims. (Cl. 260—47)

This invention relates to the modification of fluorocarbon elastomers by replacement of a portion of the fluorine atoms by methylolated phenoxy radicals, by the use of a phenoxide that ionizes in water to give only one single charged negative ion with a basic strength greater than that of acetoxy ion.

The modified fluorocarbon elastomers of the invention are characterized by the ability to be cured or cross-linked by application of heat, to form valuable products.

The fluorocarbon elastomers to which the invention applies constitute a well known class of materials. They are substantially saturated, linear, high molecular weight, rubbery materials. They are highly fluorinated polymers of fluorinated compounds which may contain other substituents besides fluorine, such as hydrogen, chlorine, bromine and nitroso. Such polymers include the elastomeric copolymers of vinylidene fluoride with other fluorinated comonomers such as hexafluoropropene (as in Viton A, A–HV, or B; Kel–F 2140; Fluorel) and chlorotrifluoroethylene (Kel–F 3700 and 5500); and copolymers of nitrosotrifluoromethane with such fluorinated comonomers. For example, Honn et al., U.S. Patent 2,833,752, at column 3, lines 36–55, list $CF_2=CHCl$, $CF_2=CClF$, $CF_2=CCl_2$, $CF_3—CF=CF_2$, $CF_2=CHCl$, $CF_3—CCl=CCl—CF_3$, $CF_2=CHF$,

$CF_3—CH=CH—CF_3$

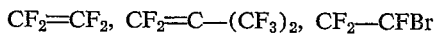
$CF_2=CF_2$, $CF_2=C—(CF_3)_2$, $CF_2—CFBr$

$CF_2=CCl—CF_3$ $CF_3—CH=CH_2$, and $CF_3—CCl=CCl_2$, as highly fluorinated mono-olefins which may be copolymerized with the hydrogen-containing mono-olefins $CF_2=HC_2$,

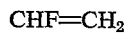
$CHF=CH_2$ $CH_2=CH_2$, $CFCl=CH_2$, $CCl_2=CH_2$, $CHCl=CH_2$, $CHBr=CH_2$ and $CH_2=C—(CF_3)CH_3$ to give rubbery high polymers. Other examples of fluorocarbon elastomers useful in the invention include the terpolymers of vinylidene fluoride, vinyl chloride and chlorotrifluoroethylene described by Honn et al., U.S. Patent 2,915,506, and the copolymers of trifluoronitrosomethane with $CF_2=CF_2$, $CH_2=CF_2$, $CF_2=CFCl$, $CF_2=CCl_2$,

$C_6H_5CH=CH_2$ $CH_2=C(CH_3)CO_2C_4H_9$ and $CF_2=CHF$ described by Crawford, Chem. and Eng. News, April 18, 1960, page 107. In the practice of the invention the preferred fluorocarbon elastomers are those derived at least in part from compounds containing a substituent selected from hydrogen and nitroso.

In accordance with the invention, a fluorocarbon elastomer is reacted with an alkali metal salt of a phenolic material selected from the group consisting of 2,6-dimethylol-4-lower-alkyl phenols wherein alkyl has 1 to 10 carbon atoms, and 2,2′-methylene-bis(4-chloro-6-methylolphenol). It is believed that in the resulting products some of the fluorine groups are replaced by methylolphenol groups, so that the polymer chains are composed of recurring fluorocarbon groups and methylolphenoxy carbon groups.

The resulting product is characterized by the ability to be cured or cross-linked simply by heating, preferably in the presence of air. The cured products are especially valuable because they do not continue to evolve hydrogen fluoride as do fluorocarbon rubbers vulcanized by prior methods. Further, films of modified fluorocarbon rubbers of the invention can be cured while exposed to air, which is not possible with prior vulcanizing methods.

The modifying agents employed in the invention may be prepared before addition to the rubber; but, in many cases, they may also be prepared in the rubber or, preferably, in a solution of the rubber.

The amount of modifying agent may be varied so as to replace from only a small amount of the fluorine up to nearly all of it. From about 2 parts to 10 parts of modifying agent per 100 parts by weight of elastomer is the preferred amount to produce the most useful results.

The modification reaction is effected by heating the elastomer and the modifying agent in mutual solution in any common solvent medium that is substantially inert under the conditions of the reaction. Among the particularly suitable solvents may be mentioned the ketones, hydrocarbons, halogenated hydrocarbons, ethers, as well as alcohols, and the like, including mixtures of such solvents. To effect the reaction the solution is conveniently heated at or below the reflux temperature of the solution. Reaction temperatures of 50°–100° C. are usual. Ordinarily a significant amount of reaction will take place within ½ hour or so, and ordinarily there is no proportionate added advantage in carrying out the reaction for more than about 10 hours.

If prepared in solution the reaction product may be isolated by evaporating the solvent, or by precipitating it with a non-solvent, such as water. The product is found to be a processible, stable rubbery material that may be shaped (e.g., calendered, molded, extruded) in essentially the same manner as the unmodified fluorocarbon elastomer. The product is stable in solution and in bulk.

The product can be cured or cross-linked simply by heating it to an elevated temperature, with or without prior addition of conventional compounding ingredients such as acid acceptors (e.g., magnesium oxide, furnace black), preferably while exposed to air or, less preferably, in an inert atmosphere. The time and temperature conditions employed for such cure are generally inversely related and will vary widely in practice, depending on such factors as the degree of cure desired, the kind and amount of modifying agent employed, the extent of modification, the size of the article, the character of the heating device, the presence or absence of air, etc. In many cases particularly useful results are obtained by heating for a period of from about ½ to 10 hours at a temperature of from about 250° to 400° F.

The modified fluorocarbon elastomer of the invention need not be isloated as such but may, for example, be deposited as a solution directly upon a non-adherent casting surface, or on a supporting backing such as fabric or the like, and may then be cured in situ.

Expanded products may be made by compounding with a blowing agent prior to cure.

The cured products of the invention are useful in making fuel cells, protective clothing such as gloves or boots, and the like.

The invention is further illustrated but not limited by the examples which follow:

EXAMPLE 1

This example illustrates the modification of Viton A–HV fluorocarbon elastomer (copolymer of vinylidene fluoride and hexafluoropropene in mole ratio of 4:1) by potassium 4-tert-butyl-2,6-dimethylolphenoxide.

To 200 grams of Viton A–HV, dissolved in 2000 ml. of 2-butanone, was slowly added 400 ml. of an ethanol solution containing the dissolved reaction product of 0.120 mole of potassium hydroxide (6.73 gms.) and 0.120 mole of 4-tert-butyl-2,6-dimethylolphenol (25.2 gms.). This is a loading of 12.6 parts of methylolphenoxide ion per 100 gms. of Viton A–HV.

The solutions were combined and refluxed at 74°–76° C. for 1 hour, then cooled. A film of the cooled solution was cast on a glass plate and a white, rubbery polymer which resembled untreated Viton A–HV was obtained. The remainder of the solution was precipitated with water, then purified by successively redissolving in 2-butanone and reprecipitating by water 3 times.

By analysis it contained 57.5% F, 36.2% C, and 2.1% H. This corresponds to 11.0 gms. of 4-tert-butyl-2,6-dimethylolphenol attached to every 100 gms. of Viton A–HV elastomer (87.5% yield). Further evidence of the modification of Viton A–HV is shown by the fact that the dried film cast from the reaction mixture crosslinked tightly (i.e., became insoluble in hot 2-butanone) when heated 30 min. at 325° F. in an air oven.

EXAMPLE 2

This example illustrates the modification of Viton A–HV fluorocarbon elastomer by the monopotassium salt of 2,2'-methylene-bis(4-chloro-6-methylolphenol).

To 12.5 grams of Viton A–HV, dissolved in 250 ml. of 2-butanone, was added slowly 50 ml. of an ethanol solution containing the dissolved reaction product of 0.003 mole of potassium hydroxide (0.182 gm.) and 0.003 mole (1.05 grams) of 2,2'-methylene-bis(4-chloro-6-methylolphenol). This is a loading of approximately 8.4 parts of the methylolphenoxide ion per 100 grams of Viton A–HV.

The combined solutions were refluxed 1 hour at 74–76° C., then cooled. A film was cast on a glass plate to obtain rubbery polymer resembling Viton A–HV. The polymer from the remainder of the solution was precipitated, purified, and dried as in Example 1. By analysis the purified elastomer contained 64.13% F, 33.8% C, and 2.1% H. This corresponds to 3.03 gms. of the phenoxy moiety attached to every 100 gms. of Viton A–HV (36% yield). Further evidence of the modification of Viton A–HV by this reagent is the fact that the dried film cast from the reaction solution crosslinked tightly (i.e., became insoluble in hot 2-butanone) after being heated 30 min. at 330° F. in an air oven.

EXAMPLE 3

This example illustrates the modification of Viton A–HV fluoroelastomer by the potassium salt of 2-methyl-4-tert-butyl-6-methylophenol.

To 12.5 grams of Viton A–HV dissolved in 250 ml. of 2-butanone was slowly added 50 ml. of an ethanol solution of the reaction product of 0.003 mole of potassium hydroxide (0.182 gm.) and 0.003 mole of 2-methyl-4-tert-butyl-6-methylolphenol (0.696 gram). This is a loading of approximately 6.0 parts of the phenoxide ion per 100 grams of Viton A–HV.

The solution was refluxed for 1 hour at 74°–76° C. and then cooled. The polymer was precipitated, purified and analyzed as follows: 60% F, 35.2% C, and 2.4% H. This corresponds to 6.8 gms. of 2-methyl-4-tert-butyl-6-methylol-phenol per 100 gms. of Viton A–HV for an apparent yield of 100%.

EXAMPLE 4

This examplee illustrates the modification and ultimate cross-linking of Kel-F elastomer by the potassium salt of 2,2'-methylenebis(4-chloro-6-methylolphenol).

A solution of 2.31 grams of potassium hydroxide in 25 ml. of ethanol was mixed with a solution of 13.55 grams of 2,2'-methylenebis(4-chloro-6-methylolphenol). The resultant solution was stirred into a solution of 10 grams of Kel-F 3700 (copolymer of chlorotrifluoroethylene and vinylidene fluoride in mole ratio of 1:2) in 180 ml. of 2-butanone; the solution was heated to reflux (68° C.) for 1 hour, then cooled, the polymer precipitated by addition of water, and purified by redissolving it in 2-butanone and reprecipitating with water. After drying 24 hours at 50° C. the polymer resembled untreated Kel-F in appearance. Analysis, found: 35% C, 20% H, 46% F, 14.2% Cl. This analysis shows that 21.7 parts of the phenoxy moiety had combined with 100 parts of Kel-F elastomer.

A sample of the product was dissolved in 2-butanone and poured onto a glass plate and allowed to dry at room temperature. The resultant film was heated at 320° F. for one hour whereupon it became insoluble in 2-butanone, a result which shows that the product has become cross-linked.

Kel-F 3700 treated in the same manner as above except that no potassium salt of 2,2-methylenebis(4-chloro-6-methylolphenol) was used or that 2,2-methylenebis(4-chloro-6-methylolphenol) was used instead, showed no reaction, i.e., was not modified and did not become cross-linked when a film was heated.

It is seen that the saturated fluorocarbon rubbers require an alkali metal salt of the methylolated phenol to produce a cross-linked product, whereas olefinic rubbers are vulcanizable by the methylolated phenol itself as described in the prior art. Further, it is noted that cure was obtained in air; prior known cures for fluoroelastomers do not produce a useful cure in the presence of air.

EXAMPLE 5

This example shows the air cure of a fluorocarbon elastomer without isolation of the modified soluble polymer.

One hundred twenty-five grams of a masterbatch containing 100 parts of Viton A–HV elastomer, 20 parts of FEF black (Philblack A) and 5 parts of acid acceptor (magnesium oxide), were dissolved in 500 ml. of 2-butanone. Into this cement was slowly stirred 200 ml. of an ethanol solution containing 3.02 grams of potassium hydroxide and 10.75 grams of 4-tert-butyl-2,6-dimethylolphenol. This corresponds to a loading of 10 parts of the phenol moiety per hundred of elastomer. The solutions were combined then refluxed at 74° C. for 1 hour, followed by the spreading of a film, 0.020 inch thick after drying, on glass by successive passes with a small knife spreader. The dried film was given an air oven cure of 30 min. at 325° F. The cured physical properties are as follows:

| | |
|---|---|
| Tensile | p.s.i.   2000 |
| Elongation at break | percent   366 |
| Modulus (100%) | p.s.i.   598 |
| Modulus (200%) | p.s.i.   1224 |
| Modulus (300%) | p.s.i.   1758 |

*Solubility—24 Hrs. at Room Temperature in 2-Butanone*

| | |
|---|---|
| Percent sol | 5.0 |
| Swelling index | 2.9 |

EXAMPLE 6

This example shows the air cure of compounded fluoroelastomer by the alkali metal salt of 2,2'-methylene-bis(4-chloro-6-methylolphenol).

Sixty-two and one-half grams of a masterbatch containing 100 parts of Viton A–HV elastomer, 20 parts of FEF black (Philblack A), and 5 parts of an acid acceptor (magnesium oxide), were dissolved in 335 ml. of 2-butanone. Four and one-half grams (9.0 parts per hundred of elastomer) of the monosodium salt of 2,2'-methylene-bis(4-chloro-6-methylolphenol), dissolved in 100 ml. ethanol, were stirred slowly into the Viton cement. The solutions were combined, then refluxed at 74° C. for 1 hour and finally allowed to cool.

A film, 0.020 inch thick after drying, was cast on a glass plate by successive passes with a small knife spreader. The film was given an air oven cure of 30 min. at 320° F. The cured physical properties were as follows:

Tensile _____p.s.i__ 2775
Elongation at break_____percent__ 565
Modulus (100%) _____p.s.i__ 357
Modulus (200%) _____p.s.i__ 956
Modulus (300%) _____p.s.i__ 1630

*Solubility—24 Hrs. in 2-Butanone at Room Temperature*

Percent soluble _____ 14.0
Swelling index _____ 4.9

EXAMPLE 7

This example illustrates the rapid cure in air that is possible when Viton elastomers are modified with an alkali metal salt of 2,2'-methylene-bis(4-chloro-6-hydroxymethylphenol).

Commercial grade glass and asbestos yarns were coated by dipping in a Viton-B (copolymer of vinylidene fluoride and hexafluoropropene in mole ratio of 4:1) compounded cement (20% total solids in 2-butanone) which had been pre-reacted with 5 parts (per 100 of the elastomer) of the potassium salt of 2,2'-methylene-bis(4-chloro-6-hydroxymethylphenol), according to the procedure outlined in Example 6. The yarns were run continuously through a dipping, drying and curing cycle for the times and at the speeds indicated in Table I. Cure was checked by immersing sections of the coated yarns in warm 2-butanone.

TABLE I

| Yarn | Curing Temperature, ° F. | Cure Time, min. | Solubility in 2-butanone |
|---|---|---|---|
| Glass | 400 | 1.2 | Insol. |
| Asbestos | 460 | 0.50 | Insol. |
| Do | 500 | 0.25 | Insol. |
| Do | 500 | 0.125 | Insol. |

EXAMPLE 8

This example shows that the high temperature heat stability of Viton A–HV, cross-linked with alkali metal salts of methylol phenols, is greater than that obtainable with known cross-linking agents.

The HF evolution of Viton A–HV uncured, cured with hexamethylene carbamate, and cured with the sodium salt of 2,2'-methylene-bis(4-chloro-6-methylolphenol) when the stocks, as films, were heated at 330° F., was measured. The data are recorded in Table II:

TABLE II

| Stock | A | B | C |
|---|---|---|---|
| Viton A–HV | 100 | 100 | 100 |
| Carbon black | 20 | 20 | 20 |
| Magnesium carbonate | 5 | 5 | 5 |
| Hexamethylenediamine carbamate | | 1.25 | |
| Sodium 2,2'-methylene-bis(4-chloro-6-methylolphenol) | | | 9.0 |

Mixes A and B were press-cured 30' at 330° F., then post-cured in an air oven for 24 hrs. at 400° F. Mix C was air-oven cured 30' at 330° F.

*Properties*

| | | | |
|---|---|---|---|
| Tensile, p.s.i | 480 | 1,782 | 1,810 |
| Elongation, percent | 600 | 352 | 450 |
| Modulus (300%), p.s.i | 160 | 1,625 | 1,275 |
| Milliequivalents of HF/100 grams Viton A, evolved during aging at 550° F. for 3 hrs | 14.2 | 89.0 | 14.9 |

These data show that the amount of HF evolved from Viton A–HV when cured by the salt of the methylolphenol is no greater than that from the uncured stock, whereas the stock cured by a diamine has become less stable, i.e. it evolves HF at a far greater rate. It is to be noted that both B and C are well cured, i.e., the difference in rate is not due to a difference in degree of cure.

Having thus described my invention, what I claim and desire to protect by Letters Patent is:

1. A method of modifying a fluorocarbon elastomer which is a substantially saturated, linear, rubbery polymer of a fluorinated carbon compound wherein any substituents of said compound other than fluorine are selected from the group consisting of hydrogen, chlorine, bromine and nitroso, comprising mixing 100 parts by weight of said elastomer with from 2 to 10 parts by weight of an alkali metal salt of a phenolic material selected from the group consisting of 2,6-dimethylol-4-(lower alkyl) phenols and 2,2'-methylene-bis(4-chloro-6-methylolphenol), and subjecting the mixture to time-temperature conditions sufficient to produce substantial reaction between said elastomer and phenoxide.

2. A method of modifying a fluorocarbon elastomer which is a copolymer of a monomer selected from the group consisting of vinylidene fluoride and nitrosotrifluoromethane with a monomer selected from the group consisting of chlorotrifluoroethylene and hexafluoropropene, which comprises mixing 100 parts by weight of said elastomer with 2 to 10 parts by weight of an alkali metal salt of a phenolic material selected from the group consisting of 2,6-dimethylol-4-(lower alkyl) phenols and 2,2'-methylene-bis(4-chloro-6-methylolphenol), and heating the mixture at 50°–100° C. for ½ to 10 hours.

3. A method as in claim 2 in which the phenolic material is a 2,6-dimethylol-4-(lower alkyl) phenol.

4. A method as in claim 2 in which the phenolic material is 2,2'-methylene-bis(4-chloro-6-methylolphenol).

5. A method as in claim 3 in which the elastomer is a vinylidene fluoride-hexafluoropropene copolymer.

6. A method as in claim 4 in which the elastomer is a vinylidene fluoride-hexafluoropropene copolymer.

7. A method as in claim 3 in which the elastomer is a vinylidene fluoride-chlorotrifluoroethylene copolymer.

8. A method as in claim 4 in which the elastomer is a vinylidene fluoride-chlorotrifluoroethylene copolymer.

9. A method of making a cured, shaped article from a fluorocarbon elastomer which is a substantially saturated, linear, rubbery polymer of a fluorinated carbon compound wherein any substituents of said compound other than fluorine are selected from the group consisting of hydrogen, chlorine, bromine and nitroso, comprising mixing 100 parts by weight of said elastomer with 2 to 10 parts by weight of an alkali metal salt of a phenolic material selected from the group consisting of 2,6-dimethylol-4-(lower alkyl) phenols and 2,2'-methylene-bis(4-chloro-6-methylolphenol), heating the mixture at 50°–100° C. for ½ to 10 hours to provide an uncured reaction product of said elastomer and said phenol, shaping the uncured reaction product into a desired form, and thereafter curing the reaction product by heating it at a temperature of 250°–400° F. for ½ to 10 hours.

10. A method of making a cured, shaped article from a fluorocarbon elastomer which is a copolymer of a monomer selected from the group consisting of vinylidene fluoride and nitrosotrifluoromethane with a monomer selected from the group consisting of chlorotrifluoroethylene and hexafluoropropene, which comprises mixing 100 parts by weight of said elastomer with 2 to 10 parts by weight of an alkali metal salt of a phenolic material selected from the group consisting of 2,6-dimethylol-4-(lower alkyl) phenol and 2,2'-methylene-bis(4-chloro-6-methylolphenol), heating the mixture at 50°–100° C. for ½ to 10 hours to provide an uncured reaction product of said elastomer and salt, shaping the uncured reaction product into a desired form, and thereafter curing the reaction product by heating it at a temperature of 250°–400° F. for ½ to 10 hours.

11. A reaction product of 100 parts by weight of a fluorocarbon elastomer which is a substantially saturated, linear, rubbery polymer of a fluorinated carbon compound wherein any substituents of said compound other than fluorine are selected from the group consisting of hydrogen, chlorine, bromine and nitroso, with from 2 to 10 parts of an alkali metal salt of a phenolic material selected from the group consisting of 2,6-dimethylol-4-(lower alkyl) phenol and 2,2'-methylene-bis(4-chloro-6-methylolphenol), the said reaction product being made by heating the said polymer and salt in admixture at 50°–100° C. for ½ to 10 hours.

12. A reaction product of 100 parts by weight of a fluorocrabon elastomer which is a copolymer of a monomer selected from the group consisting of vinylidene fluoride and nitrosotrifluoromethane with a monomer selected from the group consisting of chlorotrifluoroethylene and hexafluoropropene, with from 2 to 10 parts of an alkali metal salt of a phenolic material selected from the group consisting of 2,6-dimethylol-4-(lower alkyl) phenol and 2,2'-methylene-bis(4-chloro-6-methylolphenol), the said reaction product being made by heating the said copolymer and salt in admixture at 50°–100° C. for ½ to 10 hours, and the said reaction product thereafter being cured by heating at a temperature of 250°–400° F. for ½ to 10 hours.

References Cited in the file of this patent

UNITED STATES PATENTS 2,454,209 Rogers _____ Nov. 16, 1948

OTHER REFERENCES

Brodskii: Chemical Abstracts, volume 54, 7211g (April 1960).